(12) United States Patent
Nakai et al.

(10) Patent No.: US 9,249,483 B2
(45) Date of Patent: Feb. 2, 2016

(54) ALUMINUM ALLOY MATERIAL FOR STORAGE CONTAINER FOR HIGH-PRESSURE HYDROGEN GAS

(75) Inventors: Manabu Nakai, Kobe (JP); Shigenobu Yasunaga, Kobe (JP)

(73) Assignees: Kobe Steel, Ltd., Kobe-shi (JP); MITSUBISHI ALUMINUM COMPANY, LTD., Tokyo (JP); UACJ Corporation, Tokyo (JP); NIPPON LIGHT METAL COMPANY, LTD., Tokyo (JP); SHOWA DENKO K.K., Tokyo (JP)

( * ) Notice: Subject to any disclaimer, the term of this patent is extended or adjusted under 35 U.S.C. 154(b) by 732 days.

(21) Appl. No.: 13/635,693

(22) PCT Filed: Mar. 17, 2011

(86) PCT No.: PCT/JP2011/056369
§ 371 (c)(1),
(2), (4) Date: Sep. 18, 2012

(87) PCT Pub. No.: WO2011/115202
PCT Pub. Date: Sep. 22, 2011

(65) Prior Publication Data
US 2013/0164170 A1    Jun. 27, 2013

(30) Foreign Application Priority Data

Mar. 18, 2010 (JP) ................. 2010-062146

(51) Int. Cl.
| C22C 21/02 | (2006.01) |
| C22C 21/06 | (2006.01) |
| C22F 1/05 | (2006.01) |
| F17C 1/14 | (2006.01) |
| C22F 1/00 | (2006.01) |

(52) U.S. Cl.
CPC ............. *C22C 21/02* (2013.01); *C22C 21/06* (2013.01); *C22F 1/00* (2013.01); *C22F 1/05* (2013.01);

(Continued)

(58) Field of Classification Search
CPC .......... C22C 21/02; C22C 21/06; C22F 1/00; C22F 1/05; F17C 2203/0646; F17C 2203/0648; F17C 2223/0123; F17C 2223/035; F17C 2223/036

See application file for complete search history.

(56) References Cited

U.S. PATENT DOCUMENTS

| 8,152,940 B2 | 4/2012 | Nakai et al. |
| 2010/0089503 A1 | 4/2010 | Inagaki et al. |
| 2011/0247736 A1 | 10/2011 | Morita et al. |

FOREIGN PATENT DOCUMENTS

| JP | 63 161136 | 7/1988 |
| JP | 4-160131 A | 6/1992 |

(Continued)

OTHER PUBLICATIONS

International Search Report Issued Jun. 21, 2011 in PCT/JP11/56369 Filed Mar. 17, 2011.

(Continued)

*Primary Examiner* — Lois Zheng
(74) *Attorney, Agent, or Firm* — Oblon, McClelland, Maier & Neustadt, L.L.P.

(57) ABSTRACT

An object of the present invention is to provide a 6000-series aluminum alloy material for a high-pressure gas container which has both of resistance to hydrogen embrittlement and mechanical properties. In the aluminum alloy material for a high-pressure gas container, the contents of Fe, Mn and Cu fall within narrower ranges than the standard composition of AA6066 alloy. The aluminum alloy material is produced to have a structure in which a predetermined amount of fine dispersed particles are dispersed therein and coarse crystallized materials are small, and therefore strength and resistance to hydrogen embrittlement are improved, which are required for a high-pressure gas container.

20 Claims, 1 Drawing Sheet

(52) U.S. Cl.
CPC ........... *F17C 1/14* (2013.01); *F17C 2203/0604* (2013.01); *F17C 2203/0646* (2013.01); *F17C 2203/0648* (2013.01); *F17C 2221/012* (2013.01); *F17C 2223/0123* (2013.01); *F17C 2223/035* (2013.01); *F17C 2223/036* (2013.01); *F17C 2260/011* (2013.01); *F17C 2270/05* (2013.01); *Y02E 60/321* (2013.01)

(56) References Cited

FOREIGN PATENT DOCUMENTS

| | | |
|---|---|---|
| JP | 6 63681 | 3/1994 |
| JP | 7-150282 A | 6/1995 |
| JP | 2000 233245 | 8/2000 |
| JP | 2000 282197 | 10/2000 |
| JP | 2001 349494 | 12/2001 |
| JP | 3750449 | 3/2006 |
| JP | 2009 24225 | 2/2009 |

OTHER PUBLICATIONS

Extended European Search Report issued May 21, 2015 in Patent Application No. 11756386.6.

International Preliminary Report on Patentability and Written Opinion issued on Sep. 27, 2012 in PCT/JP2011/056369 (with English translation).

International Preliminary Report on Patentability and Written Opinion issued on Nov. 1, 2012 in PCT/JP2011/056369.

ALUMINUM ALLOY MATERIAL FOR STORAGE CONTAINER FOR HIGH-PRESSURE HYDROGEN GAS

TECHNICAL FIELD

The present invention relates to an AA6066-standardized aluminum alloy material for a storage container for high-pressure hydrogen gas. The main use of the present invention is a main body member of a storage container for high-pressure hydrogen gas, such as a liner. However, in the present invention, peripheral members, e.g., a mouthpiece, a gas tube for the storage container for high-pressure hydrogen gas are also included in the use application and are expressed as members "for a storage container for high-pressure hydrogen gas" collectively.

BACKGROUND ART

In recent years, hydrogen, which is used as a fuel for fuel cells, receives attention as a clean energy. However, hydrogen causes hydrogen embrittlement in metallic materials such as iron and aluminum alloys. Therefore, it is difficult to efficiently store highly pressurized hydrogen in a storage container for high-pressure hydrogen gas (e.g., a gas cylinder) to be mounted in an automobile. This problem also occurs not only in dominating iron high-pressure gas containers but also in high-pressure gas containers in which an aluminum alloy liner is used for weight reduction purposes. Thus, high-pressure gas containers are required to have excellent resistance to hydrogen embrittlement from the view point of reliability.

In a storage container for high-pressure hydrogen gas using an aluminum alloy liner, it is a mainstream practice to include a composite material produced by winding a fiber-reinforced resin or a fiber for reinforcement around the outer surface of the aluminum alloy liner (filament winding), rather than including an aluminum alloy alone.

For example, Patent Document 1 discloses a method for producing a storage container for high-pressure hydrogen gas using an aluminum alloy liner made of a precipitation hardened 7000-series aluminum alloy extrusion material having high strength. That is, the 7000-series aluminum alloy extrusion material is subjected to drawing, and the drawn product is subjected to a solution heat treatment and then subjected to impact processing, thereby forming a cylindrical body with a bottom. Subsequently, a gas discharge port is formed on the cylindrical body with a bottom by cold forging, and the cylindrical body with a bottom is then aged. In this manner, a small-sized high-pressure gas container is produced.

In Patent Documents 2 and 3, it is proposed to further improve the yield strength of an aluminum alloy liner and also improve a method for producing the liner. That is, it is proposed that a 7000-series aluminum alloy material is subjected to a solution heat treatment and then subjected to ironing while applying a plastic strain to shape the material into the form of a liner, thereby to eliminate an aging treatment to be performed after the solution heat treatment. In Patent Document 3, it is also proposed to use a 7000-series aluminum alloy or an aluminum alloy having a composition standardized to AA6066 (also referred to as "AA6066-standardized aluminum alloy" or an "AA6066 alloy", hereinafter) which has excellent stress corrosion cracking resistance (SCC resistance) as a liner material.

This type of a liner material for a storage container for high-pressure hydrogen gas including a 6066 aluminum alloy is also proposed in Patent Document 4. Among 6000-series aluminum alloys, the 6066 alloy is a precipitation-hardened aluminum alloy material having high Mg and Si amounts and relatively high strength, and is therefore a promising liner material for a storage container for high-pressure hydrogen gas.

However, if the 6066 aluminum alloy material is used as a liner material regardless of the types of hot processing methods to be employed or the forms of a rolled sheet, an extrusion material, a forged material and the like, the 6066 aluminum alloy material is required to have resistance to hydrogen embrittlement such that the 6066 aluminum alloy material does not embrittle even when the pressure employed for filling a hydrogen gas into a storage container for high-pressure hydrogen gas to be mounted in an automobile is increased. The 6066 aluminum alloy material is also required to have higher strength for the purpose of reducing the thickness of the liner for reducing the weight of the liner.

In this regard, the above-mentioned 7000-series aluminum alloy has higher strength than that of the 6066 alloy. However, the 7000-series alloy contains major elements such as Zn, Mg and Cu at high contents, and therefore has a problem of the occurrence of stress corrosion cracking (SCC) in which hydrogen embrittlement is also involved. Particularly in a high-strength 7000-series alloy of which the strength is increased by performing a peak aging treatment or the like in place of an over-aging treatment, resistance to hydrogen embrittlement is further decreased. Moreover, when the amounts of the major elements added are increased, the cracking of a billet or a slab is likely to occur during melting or casting. In addition, cracking is likely to occur during hot processing such as rolling, forging or extrusion, and during extrusion, problems also occur such that an extrusion rate becomes extremely low, which leads to a reduction in production performance.

For this reason, it can be said that, among aluminum alloys, the AA6066 alloy material is best suited for a storage container for high-pressure hydrogen gas. However, in order to use the 6066 aluminum alloy material as a liner material, it is continuously perceived as an important issue to be improved in both resistance to hydrogen embrittlement and strength.

For this reason, Patent Document 5 proposes that Mg and Si, which are elements contained in AA6066 alloy composition, are contained in amounts falling within specified ranges that satisfy each formula: Mg≤1.73 Si-0.52%, Mg≤1.5%, Mg≥0.9% and Si≤1.8%, thereby improving the resistance to hydrogen embrittlement of the AA6066 alloy.

PRIOR ART DOCUMENTS

Patent Documents

Patent Document 1: JP 6-63681 A
Patent Document 2: JP 3750449 B
Patent Document 3: JP 2000-233245 A
Patent Document 4: JP 2001-349494 A
Patent Document 5: JP 2009-24225 A

DISCLOSURE OF THE INVENTION

Problem to be Solved by the Invention

In Patent Document 5, although the resistance to hydrogen embrittlement of the AA6066 aluminum alloy materials can be improved indeed, the AA6066 aluminum alloy material after being subjected to a T6 tempering treatment have mechanical properties such that an AA6066 aluminum alloy material having the highest strength among the aluminum alloy materials produced in examples has a tensile strength of 403 MPa and a 0.2% yield strength of 387 MPa. Therefore, the AA6066 aluminum alloy material is required to have further improved strength for the purpose of reducing the thickness of a liner for reducing the weight of the liner in a storage container for high-pressure hydrogen gas.

The present invention has been made in view of the above-mentioned problems, and an object of the present invention is to provide an aluminum alloy material for a storage container for high-pressure hydrogen gas, which has excellent resistance to hydrogen embrittlement and more improved strength.

Means for Solving the Problem

In order to achieve the object, a gist of the present invention is to provide an aluminum alloy material for a storage container for high-pressure hydrogen gas, comprising, in mass %, 0.8 to 1.4% of Mg; 0.9 to 1.8% of Si; less than 0.44 (excluding 0%) of Fe; 0.05 to 1.2% of Cu; 0.2 to 0.9% of Mn; 0.40% or less (including 0%) of Cr; 0.25% or less (including 0%) of Zn; and 0.20% or less (including 0%) of Ti; with a remaining portion including Al and unavoidable impurities, wherein a relationship between C and D satisfies the formula: $D+0.0011 \times C - 9.5 \leq 0$ when D represents the average density (particles/μm$^2$) of dispersed particles each having an equivalent circle diameter of 800 nm or less and C represents the average density (particles/mm$^2$) of crystallized materials each having an equivalent circle diameter of 0.38 μm or more in a structure of the aluminum alloy material.

The chemical composition of an aluminum alloy material according to the present invention is the composition of a standardized AA6066 alloy, wherein the contents of Fe, Mn and Cu are limited within narrower ranges than those for the standardized composition and the contents of Mg, Si, Cr, Zn and Ti are the same as those for the standardized AA6066. The term "aluminum alloy material" as used herein includes a rolled sheet produced by hot rolling, a rolled sheet produced by cold rolling, a shaped material produced by hot extrusion, and a forged material produced by hot forging. With respect to the mechanical properties of the aluminum alloy material after being subjected to a T6 tempering treatment, it is preferred that the tensile strength is 410 MPa or more, the 0.2% yield strength is 360 MPa or more, and the elongation is 10% or more. The aluminum alloy material is suitably used as a liner material for a storage container for high-pressure hydrogen gas in such a manner that a fiber-reinforced resin or a fiber for reinforcement is wound around the outside of the aluminum alloy material. With respect to the resistance to hydrogen embrittlement of the aluminum alloy material, it is preferred that the aluminum alloy material has an index of resistance to hydrogen embrittlement represented by $[(\delta1-\delta2)/\delta1]$ of 0.1 or less (including a negative value) when δ1 represents an elongation value of the aluminum alloy material that is tensile-deformed in a dried atmosphere of 5% RH or less and δ2 represents an elongation value of the aluminum alloy material that is tensile-deformed in a highly humid atmosphere of 90% RH or more in the case where the aluminum alloy material is tensile-deformed at a strain rate of $6.7 \times 10^{-7}$ s$^{-1}$ or less under different atmospheric conditions.

Effects of the Invention

The present inventors have made studies on a relationship between the composition and structure of the AA6066 alloy and the resistance to hydrogen embrittlement and strength of the AA6066 alloy. As a result, it has been found that, in the composition of the AA6066 alloy, particularly the contents of transition elements Fe and Mn as well as Cu, other than the major elements Mg and Si, have a great influence on the resistance to hydrogen embrittlement. It has been also found that the average densities of dispersed particles and crystallized materials both formed by these transition elements have a great influence on the resistance to hydrogen embrittlement.

For example, in composition particularly to the AA6066 alloy, when the content of the transition element Fe is increased, the numbers (densities) of the dispersed particles and crystallized materials are increased in the structure of the AA6066 alloy material. However, it has been found that the behavior (action) of the dispersed particles and the behavior (action) of the crystallized materials are quite different from each other, and that the resistance to hydrogen embrittlement is greatly improved when the (average) density of the dispersed particles is increased and, on the contrary, the resistance to hydrogen embrittlement is greatly deteriorated when the (average) density of the crystallized materials is increased.

The reason why the dispersed particles can improve the resistance to hydrogen embrittlement is that the dispersed particles function as a hydrogen trapping site in the 6066 alloy and therefore have an effect of preventing the accumulation of hydrogen at crystal grain boundaries. Further, the dispersed particles are fine and have nano-order particle sizes when the material is produced in a routine manner. Therefore, it is presumed that the dispersed particles rarely act as an initiation site for fracture even when hydrogen is trapped on the dispersed particles, and can improve the resistance to hydrogen embrittlement. Further, as is well known, the dispersed particles have an effect of preventing the occurrence of recrystallization and an effect of reducing the sizes of crystal grains. Therefore, it is presumed that these effects are involved in an increase in strength and an improvement in resistance to hydrogen embrittlement. Therefore, the resistance to hydrogen embrittlement and strength can be improved by securing a predetermined amount of the dispersed particles.

In contrast, the crystallized materials are also assumed as a site on which hydrogen is accumulated. However, in the crystallized materials that exist on the surface and surface layer of a sample, the interface between each of the crystallized materials and the matrix phase is considered to be a site through which hydrogen can invade into the inside of the material easily. It is presumed that, if the density of the crystallized materials is increased, the number of sites through which hydrogen invades into the inside of the material is also increased, and therefore fracture may easily occur by the accumulation of hydrogen at crystal grain boundaries or the like. Moreover, the crystallized materials have micron-order sizes which are larger than those of the dispersed particles. Thus, the crystallized materials act as an initiation site for fracture when hydrogen invades, and mechanical properties such as toughness and fatigue properties are deteriorated when the density of the crystallized materials is increased. Therefore, the resistance to hydrogen embrittlement as well as toughness and fatigue properties are improved by regulating the amount of the crystallized materials to an amount as small as possible.

Incidentally, in Ni alloy materials and iron steel materials, precipitates have been conventionally regulated because of their action as an initiation site for hydrogen embrittlement or cracking, or conversely, have been treated as an effective hydrogen trapping site. However, in the field of aluminum alloys, particularly high-strength 6000-series alloys such as an AA6066 alloy, little has been known about the relationship between the dispersed particles or the crystallized materials and the resistance to hydrogen embrittlement. It is presumed that this is because there are few examples of studies on a high-pressure gas container (gas cylinder) in which a high-strength aluminum alloy is applied as a liner, in spite of the fact that attention is focused on such a high-pressure gas container (gas cylinder) as a high-pressure storage container for hydrogen.

In the present invention, the aluminum alloy material has specified composition of which the range is narrower than that of the composition for the AA6066 alloy, and also has a structure in which a predetermined amount of fine dispersed particles are dispersed and the amount of coarse crystallized materials is reduced. Thus, the present invention can provide an aluminum alloy material that has excellent resistance to hydrogen embrittlement and highly improved strength and is suitable as a high-pressure storage container for hydrogen.

BEST MODE FOR CARRYING OUT THE INVENTION (Composition of Aluminum Alloy)

First, the chemical composition of an aluminum alloy material according to the present invention will be described below, including the reasons for limiting the contents of each element. As mentioned above, the chemical composition of the aluminum alloy material according to the present invention is specified composition of which the range is narrower than that of the composition for an AA6066 alloy, so that the aluminum alloy material after T6 tempering can have mechanical properties required for use in a storage container for high-pressure hydrogen gas. That is, for the purpose of controlling dispersed particles or crystallized materials so as to improve resistance to hydrogen embrittlement or strength, among the major elements specified in the standard for AA6066 alloys, particularly the contents of Fe and Mn are limited within the narrower ranges than those specified in the standard and are well balanced. The term "T6 tempering" means that the aluminum alloy material is subjected to a solution heat treatment and a quenching treatment and then the resultant product is subjected to a peak aging treatment.

More specifically, the range of the chemical composition of the aluminum alloy material according to the present invention is narrower than that for the standardized AA6066 alloy composition, and the chemical composition includes, in mass %, 0.8 to 1.40 of Mg; 0.9 to 1.8% of Si; less than 0.44 (excluding 0%) of Fe; 0.7 to 1.2% of Cu; 0.7 to 0.9% of Mn; 0.40% or less (including 0%) of Cr; 0.25% or less (including 0%) of Zn; and 0.20% or less (including 0%) of Ti; with a remaining portion including Al and unavoidable impurities. The ranges of the contents of Mg, Si, Cu, Cr, Zn and Ti to be specified, excluding the contents of Fe and Mn, are the same as those standardized (upper limit and lower limit) for AA6066. All the "%" for expressing the content of each element means "% by mass".

Other elements than those mentioned above are impurities as in the case in the standard for AA6066, and the content of each of the impurities is 0.05% or less in terms of the content of an element and the total content of the impurities in terms of the contents of elements is 0.15% or less (an acceptable amount) as specified in the standard for AA6066.

With respect to each element, the preferred content range and the meaning thereof or the acceptable amount in the composition of the aluminum alloy material according to the present invention will be described below.

Si: 0.9 to 1.8%

A portion of Si exists in the form of a solid solution in an aluminum alloy matrix together with Mg, and is involved in solid solution strengthening. Si also exhibits an aging hardening capability, i.e., a capability of forming aging precipitates or the like that are contributed to an improvement in strength, during an artificial tempering treatment at relatively high temperature, and is therefore an element essential for achieving the high strength and the high yield strength which are required for satisfying mechanical properties needed for use in a storage container for high-pressure hydrogen gas. If the Si content is too small, the absolute amount thereof becomes insufficient, and therefore the solid solution strengthening and the aging hardening capability are not achieved satisfactorily. As a result, required levels of the high strength and the high yield strength cannot be achieved. On the other hand, if the Si content is too large, strength becomes too high, and corrosion resistance and resistance to hydrogen embrittlement are deteriorated. Further, Si cannot exist in the form of a solid solution in the matrix, and therefore coarse crystallized materials and precipitates are formed and the resistance to hydrogen embrittlement is deteriorated, resulted in deteriorations in strength, elongation and on the like. Furthermore, processabilities including rolling, extrusion and forging are also deteriorated during the production of a sheet material or a shaped material. For the above reasons, the Si content falls within the range from 0.9 to 1.8%, as specified in the standard for AA6066.

Mg: 0.8 to 1.4%

Likewise Si, Mg exhibits solid solution strengthening, and forms aging precipitates that are contributed to an improvement in strength together with Si during the artificial aging treatment and therefore exhibits an aging hardening capability. Accordingly, Mg is an essential element for achieving the high strength and the high yield strength which are required for satisfying mechanical properties needed for use in a storage container for high-pressure hydrogen gas. If the Mg content is too small, the absolute amount thereof becomes insufficient, and therefore the solid solution strengthening and the aging hardening capability are not achieved satisfactorily. As a result, required levels of the high strength and the high yield strength cannot be achieved. On the other hand, if the Mg content is too large, strength becomes too high, and corrosion resistance and resistance to hydrogen embrittlement are deteriorated. Further, Si cannot exist in the form of a solid solution in the matrix, and therefore coarse crystallized materials and precipitates are formed and the resistance to hydrogen embrittlement is deteriorated, resulted in deteriorations in strength, elongation and on the like. Furthermore, processabilities including rolling, extrusion and forging are also deteriorated during the production of a sheet material or a shaped material. For the above reasons, the Mg content falls within the range from 0.8 to 1.4%, as specified in the standard for AA6066.

Fe: Less than 0.44 (Excluding 0%)

According to the standard for AA6066, Fe is contained in an amount of 0.50% or less (including 0%) as an impurity. However, in some examples described in Patent Document 5 or the like, the content of Fe exceeds this range and is contained in an amount of up to 0.65%. Therefore, Fe itself or the Fe content has been recognized merely as an acceptable amount of an inevitably contained common impurity derived from a melting raw material produced with a scrap.

In the present invention, in contrast, for the purpose of allowing a predetermined amount of fine dispersed particles having nano-order sizes to exist, Fe is contained as an essential element in a substantial amount of less than 0.44%. Likewise Mn, Fe enables the formation of fine Al—(Fe, Mn, Cr)-based dispersed particles having nano-order sizes in a predetermined amount and at the specified average density during a homogenization heat treatment, and the dispersed particle functions as a hydrogen trapping site to improve the resistance to hydrogen embrittlement. Fe also has an effect of providing an improvement in strength by preventing the occurrence of recrystallization or reducing the sizes of crystal grains.

Fe is contained in a substantial amount of less than 0.44%. If the content of Fe is too large or too small than this amount, the resistance to hydrogen embrittlement is rather deteriorated. For example, if Fe is not contained or the Fe content is too small, a relationship between the average density D (particles/μm$^2$) of dispersed particles each having an equivalent circle diameter of 800 nm or less and the average density C (particles/mm$^2$) of crystallized materials each having an equivalent circle diameter of 0.38 μm or more does not satisfy the formula: D≥0.0011×C−6.6 and the effects of Fe are not achieved. Although the effect is achieved even when the Fe content is extremely small, it is preferred that Fe is contained in an amount of 0.04% or more for the purpose of ensuring the achievement of the effect regardless of the variations in conditions employed for the production of the aluminum alloy material.

If the Fe content is too large, coarse crystallized materials having micron-order sizes are formed, and therefore strength and resistance to hydrogen embrittlement are rather deteriorated. That is, the content of Fe as an impurity in the standard for AA6066, in Patent Document 5 or the like may be too large according to cases. Therefore, the Fe content is limited within a range of less than 0.44% (excluding 0%) which is narrower than that specified in the standard for AA6066.

Mn: 0.7 to 0.9%

Mn enables the formation of fine Al—(Fe, Mn, Cr)-based dispersed particles having nano-order sizes in a predetermined amount and at the specified average density during a homogenization heat treatment, and functions as a hydrogen trapping site to improve the resistance to hydrogen embrittlement. Further, a portion of Mn exists in the form of a solid solution in the aluminum alloy sheet matrix to exhibit solid solution strengthening, and the dispersed particles have an effect of preventing the occurrence of recrystallization and an effect of reducing the sizes of crystal grains.

If the Mn content is too small, the formation of the fine Al—(Fe, Mn, Cr)-based dispersed particles having nano-order sizes in a predetermined amount and at the specified average density may not be ensured. If the Mn content is too large and exceeds an upper limit as defined in the present invention of 0.9%, coarse crystallized materials having micron-order sizes are formed, and therefore strength and resistance to hydrogen embrittlement are rather deteriorated. Therefore, the Mn content is limited within a range from 0.7 to 0.9% which is narrower than that specified in the standard for AA6066.

Cu: 0.7 to 1.2%

Cu is contributed to an improvement in strength and yield strength together with Mg and Si. If the Cu content is too small, this effect cannot be achieved satisfactorily and the high strength and the high yield strength, which are necessary for satisfying the mechanical properties required as a storage container for high-pressure hydrogen gas, cannot be achieved. Further, the density of dispersed particles that trap hydrogen is reduced, resulting in deterioration in resistance to hydrogen embrittlement. On the other hand, if the Cu content is too large, strength and yield strength are rather deteriorated. Further, formability of a sheet, processabilities including rolling, extrusion and forging in the production of a sheet material or a shaped material and corrosion resistance are greatly deteriorated. The density of crystallized materials becomes high, resulting in deterioration in resistance to hydrogen embrittlement. Therefore, the Cu content falls within a range from 0.7 to 1.2% as specified in the standard for AA6066.

Cr: 0.40% or Less (Including 0%), Zn: 0.25% or Less (Including 0%), Ti: 0.20% or Less (Including 0%)

The amounts of Cr, Zn and Ti are regulated as impurities, respectively. Among these elements, Cr forms dispersed particles likewise Fe and Mn. However, the amount of Cr to be added is smaller than those of Mn and Fe and the effect of dispersed particles containing Cr is not so higher than those of Fe and Mn. Further, if the Cr content is too large, coarse crystallized materials having micron-order sizes are formed, and therefore strength and resistance to hydrogen embrittlement are rather deteriorated. Therefore, Cr is treated as an impurity, and the Cr content is regulated to a range of 0.40% or less (including 0%) as specified in the standard for AA6066.

With respect to Zn, if the Zn content is too large, intergranular corrosion sensitivity is increased and corrosion resistance is deteriorated. Therefore, Zn is treated as an impurity, and the Zn content is regulated to a range of 0.25% or less (including 0%) as specified as specified in the standard for AA6066.

Ti acts to reduce the sizes of crystal grains in an ingot together with B that is contained in the mother alloy for aiding the addition of Ti. However, if the Ti content is too large, coarse intermetallic compounds are formed, and therefore strength and resistance to hydrogen embrittlement are rather deteriorated. Further, formability of a sheet, processabilities including rolling, extrusion and forging in the production of a sheet material or a shaped material and corrosion resistance are greatly deteriorated. Therefore, Ti is treated as an impurity, and the Ti content is regulated to a range of 0.20% or less (including 0%) as specified in the standard for AA6066.

Figure 1:
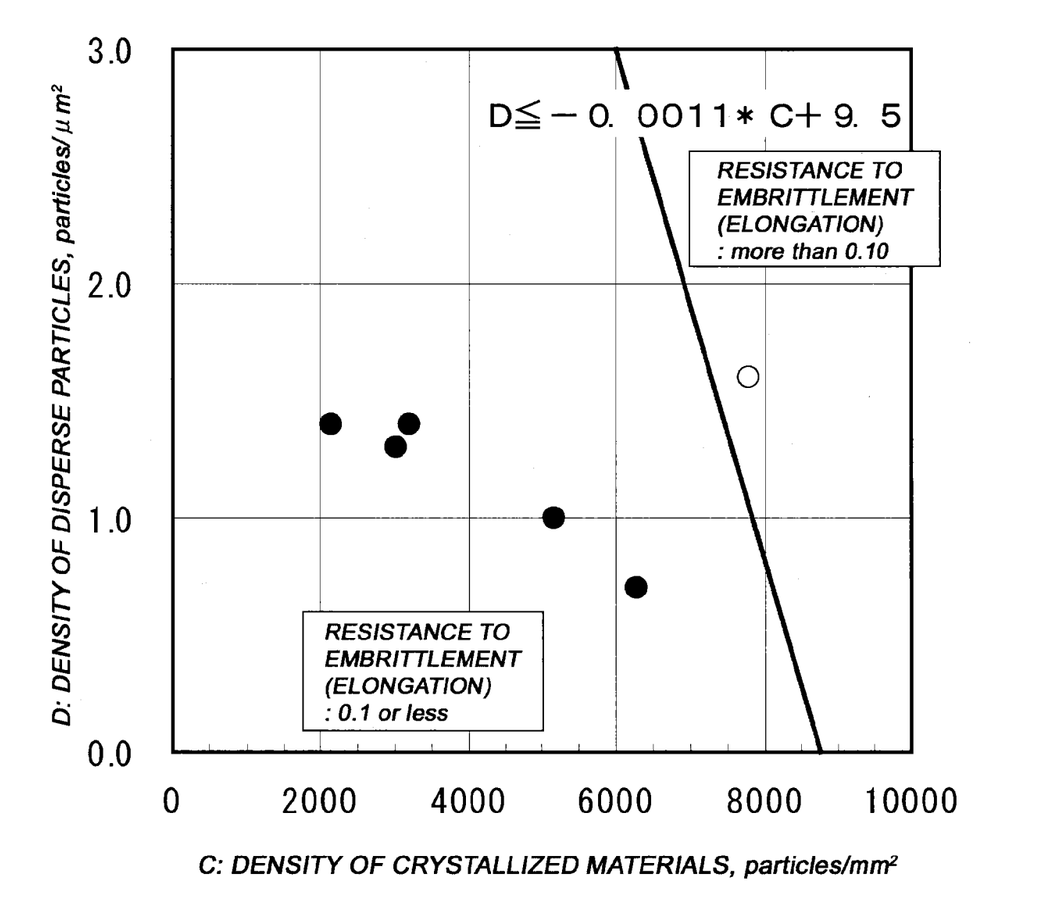
FIG. 1 is an explanatory diagram which illustrates the relational formula: $D+0.0011 \times C-9.5 \leq 0$ ($D \leq -0.0011 \times C+9.5$) between average density D of dispersed particles and average density C of crystallized materials as specified in the present invention.

Structure:

In the present invention, the ranges of the contents of Mg, Si, Cr, Zn and Ti are the same as those defined in the standard for AA6066, as stated above. Under this circumstance, a predetermined amount of fine dispersed particles are allowed to exist and the formation of coarse crystallized materials is reduced as much as possible in the structure. That is, for the purpose of achieving the resistance to hydrogen embrittlement, the relationship between the average density D (particles/μm$^2$) of dispersed particles each having an equivalent circle diameters of 800 nm or less and the average density C (particles/mm$^2$) of crystallized materials each having an equivalent circle diameter of 0.38 μm or more satisfies the formula: D+0.0011×C−9.5≤0 shown in FIG. 1. In FIG. 1, the formula: D≤−0.0011×C+9.5, which is an altered form of the formula: D+0.0011×C−9.5≤0, is shown. In FIG. 1, the average densities D of dispersed particles and the average densities C of crystallized materials obtained in the below-mentioned examples shown in Table 2 are marshaled from the viewpoint of the resistance to hydrogen embrittlement, and the average densities D of dispersed particles are plotted on the ordinate and the average densities C of crystallized materials are plotted on the abscissa. A line that rises from the vicinity of the average density of 8200 particles/mm$^2$ of the crystallized materials on the abscissa in an upper left oblique direction illustrates the formula: $D=-0.0011 \times C+9.5$. The expression that "the formula: $D+0.0011 \times C-9.5 \leq 0$, i.e., $D \leq -0.0011 \times C+9.5$, which is defined in the present invention, is satisfied" means that the coordinate points for both the average densities D of dispersed particles and the average densities C of crystallized materials are located in a region which is on the left side of the line and where the index of the resistance to hydrogen embrittlement (elongation) is 0.1 or less (including negative values). In other words, the index of the resistance to hydrogen embrittlement (elongation) exceeds 0.1 in a region which is located on the right side of the line, and the resistance to hydrogen embrittlement is deteriorated when a coordinate point for the average density D of dispersed particles or the average density C of crystallized materials is located in this region.

Incidentally, when the alloy material has the same composition as that of the 6066 alloy and contains Fe, Mn and Cu at a predetermined amount, a structure in which a predetermined amount of fine dispersed particles exist and the amount of coarse crystallized materials is reduced as much as possible can be produced regardless of the means employed for the processing of a rolled sheet, an extruded sheet or a forged material as long as the temperature of a homogenization heat treatment is selected carefully. When the alloy material is used as a liner material, the resistance to hydrogen embrittlement is achieved such that the liner material does not embrittle even when the pressure of a hydrogen gas to be filled in a storage container for high-pressure hydrogen gas to be mounted in an automobile is increased, regardless of the types of the liner material, such as a rolled sheet, an extrusion material and a forged material. Further, high strength can be also achieved even when the thickness of the liner material is reduced for reducing the weight of the liner.

Dispersed Particles:

The dispersed particles function as a hydrogen trapping site. When a material is produced in a routine manner, the dispersed particles are fine and have nano-order sizes. Therefore, the dispersed particles rarely act as an initiation site for the fracture of the material even when hydrogen is trapped on the dispersed particles, and improve both strength and resistance to hydrogen embrittlement. Further, the dispersed particles have an effect of reducing the sizes of crystal grains, as is well known. Therefore, the resistance to hydrogen embrittlement and strength can be improved by securing the dispersed particles in a predetermined amount as defined above.

On the other hand, when D represents the average density (particles/$\mu m^2$) of dispersed particles each having an equivalent circle diameter of 800 nm or less and C represents the average density (particles/$mm^2$) of crystallized materials each having an equivalent circle diameter of 0.38 µm or more, if the average density D of the dispersed particles is larger than a value determined by the formula: $-0.0011 \times C+9.5$, the (number of) dispersed particles that trap hydrogen thereon greatly increases. As a result, when the alloy material is used as a liner material, the liner is likely to embrittle when the pressure of a hydrogen gas to be filled in a storage container for high-pressure hydrogen gas is increased.

Incidentally, the dispersed particles defined in the present invention includes a compound mainly composed of transition elements such as Mn, and Al and Si. The compound may additionally contain Fe. Other transition elements such as Cr, Zr and V may also be contained in the composition depending on the amounts thereof. The dispersed particles are formed mainly during the casting of an ingot, during the homogenization heat treatment of an ingot, and the like. However, since the level of the largest length of the individual dispersed particles are largely different from (small) each other unlike the case of the crystallized materials, a TEM (transmission electron microscope) is generally used for the observation of the dispersed particles. When the TEM is used for the observation, however, only a narrow region can be observed, and therefore there is a risk that the state of a microstructure in a given region might be misunderstood as average state on the whole of a sample. Then, the dispersed particles defined in the present invention are observed and measured using an SEM (scanning electron microscope) at a relatively high magnification of 10000×. The dispersed particles defined in the present invention are not needed to be identified by an elemental analysis (analysis of element amount) using an EDX or the like. That is, all of second phase particles each having an equivalent circle diameter of 800 nm or less, which are observed (or can be observed) on the SEM under the above-mentioned conditions, are regarded as the dispersed particles defined in the present invention.

With respect to ultrafine dispersed particles (second phase particles) in which the largest equivalent circle diameter is less than 1 nm, however, it is difficult to observe the particles accurately and determine the largest length on the SEM at the magnification of 10000×, and the effect as a hydrogen trapping site is regarded as being poor. Therefore, the preferred lower limit for the largest length of the dispersed particles is 1 nm.

Measurement of Average Density of Dispersed Particles:

As in the case of the crystallized materials, the average density of the dispersed particles defined in the present invention is measured at a center part of any cross-sectional surface that is parallel to the lengthwise direction (axis direction) of a T6-tempered aluminum alloy material or a pressure container member (e.g., a liner) produced by shaping and processing the T6-tempered aluminum alloy material. A sample is prepared from the center part of the parallel cross-sectional surface and is observed using an SEM (scanning electron microscope) equipped with a component analysis device at a magnification of 10000× and an accelerating voltage of 15 kV. Images of indefinite forms of dispersed particles are converted into circles having the same area by image processing, the number of dispersed particles of which the largest diameter among the equivalent circle diameters (diameters) is 800 nm or less is counted, and the number (i.e., density) of particles per the observation area (particles/$\mu m^2$) is calculated. Generally, when the measurement is made at an accelerating voltage of 15 kV and the matrix is Al, the depth of electron beam invasion is a little more than 2 µm and the depth of observation is about ⅓ of the depth of electron beam invasion. Since only dispersed particles located on the surface of the sample are measured, blurred images that correspond to particles located in the inside of the sample are eliminated from a display during image processing. The dispersed particles located on the surface of the sample are observed as clear blight dots (in a black-and-white image, observed as white dots). The measurement is performed at any five parts on the cross-sectional surface of each of rod-shaped sample materials, and two fields are observed for each part (10 fields in total). The results are averaged, and the average value obtained is employed as an average density of the dispersed particles defined in the present invention.

Crystallized Materials:

The crystallized materials refer to crystallized materials which are precipitated during casting, or coarse $Mg_2Si$ or the like having micron-order sizes which are formed during homogenization heat treatment and hot processing and remain after subsequent solution heat treatment. It is presumed that, likewise the dispersed particles, the fine crystallized materials or crystallized materials also have a function as a hydrogen trapping site. However, when a material is produced in a routine manner, crystallized materials present in the material and having micron-order sizes are larger than the dispersed particles. Therefore, it is presumed that the crystallized materials may easily become an initiation site for fracture upon the trapping of hydrogen. Thus, the resistance to hydrogen embrittlement is improved and toughness and fatigue properties, which are generally required properties, are also improved by regulating the amount of the crystallized materials to a small amount as much as possible.

On the other hand, if the average density C (particles/mm$^2$) of crystallized materials each having an equivalent circle diameter of 0.38 μm or more is too large, even when the average density D (particles/μm$^2$) of dispersed particles each having an equivalent circle diameter of 800 nm or less is too large, the formula: D+0.0011×C−9.5≤0 is not satisfied, and coarse crystallized materials that become an initiation site for fracture are largely formed, and therefore the resistance to hydrogen embrittlement is significantly deteriorated.

The crystallized materials defined in the present invention refers to second phase particles which can be observed as indefinite forms of particles present in the matrix and having any composition, when the structure of the aluminum alloy material is observed on the SEM at a magnification of about 300× (therefore, it can be determined whether the largest value of the equivalent circle diameter defined in the present invention is 0.38 μm or more or less than 0.38 μm). The crystallized materials are mainly composed of an Mg—Si-based compound, an Si—Fe-based compound or the like (when the crystallized materials contain Cu, as well as transition elements such as Mn, Cr, Zr and V in large amounts, the compounds may additionally contain these elements). The crystallized materials includes crystallized materials which are crystallized during casting, or coarse Mg$_2$Si or the like having micron-order sizes which are formed during homogenization heat treatment and hot processing and remain after subsequent solution heat treatment. In the present invention, however, the second phase particles may have any composition, as stated above. Therefore, any elemental analysis (analysis of element amount) of the crystallized materials using an EDX (energy dispersive spectrometry) or the like is not needed in the observation on the SEM. That is, all of coarse second phase particles each having an equivalent circle diameter of 0.38 μm or more, which are observed (or can be observed) on the SEM under the above-mentioned conditions, are regarded as the crystallized materials defined in the present invention. Since different types of crystallized particles are formed depending on the compositions and the production method, the largest size of the coarse crystallized materials cannot be predicted. Further, all the coarse crystallized materials each having an equivalent circle diameter of 0.38 μm or more are particles to be regulated. Therefore, in the present invention, the upper limit of the largest size of the crystallized material particles is not specified at any way.

Measurement of Average Density of Crystallized Materials:

As in the case of the dispersed particles, the average density of the crystallized materials defined in the present invention is measured at a center part of any cross-sectional surface that is parallel to the lengthwise direction (axis direction) of a T6-tempered aluminum alloy material or a pressure container member (e.g., a liner) produced by shaping and processing the T6-tempered aluminum alloy material. The average density is measured and calculated from the observation of a structure at the center part of the parallel cross-sectional surface by a scanning electron microscope (SEM) at a magnification of 300× and an accelerating voltage of 15 kV.

That is, the crystallized materials are observed by an image analysis on a field of view to be observed by the SEM as second phase particles having any composition and existing in the field of view to be observed. Each of the crystallized materials is observed at a magnification of 300× and an accelerating voltage of 15 kV. Images of indefinite forms of crystallized materials are converted into circles having the same area by image processing, the number of crystallized materials of which the largest diameter among the diameters is 0.38 μm or more is counted, and the number (i.e., density) of crystallized materials per unit area (1 mm$^2$) of the field of view to be measured (particles/mm$^2$) is calculated. The image processing is performed on all the crystallized materials observed on the SEM. The measurement is performed at any five parts on the cross-sectional surface of each of rod-shaped sample materials, and two fields are observed for each part (10 fields in total). The results are averaged, and an averaged value obtained is employed as an average density of the crystallized materials defined in the present invention.

Production Method:

The aluminum alloy material of the present invention, such as a rolled sheet produced by hot rolling, a rolled sheet produced by cold rolling, a shaped material produced by hot extrusion or a forged material produced by hot forging, can be produced by a routine manner, as long as the aluminum alloy material has the above-mentioned specified 6066 alloy composition and the temperature of a homogenization heat treatment is selected carefully. That is, the aluminum alloy material of the present invention can have a structure in which a predetermined amount of fine dispersed particles exist and the amount of coarse crystallized materials is reduced as much as possible.

An ingot of the 6066 alloy having specified composition is formed by melting, and the ingot is subjected to a homogenization heat treatment. Subsequently, the treated product is subjected to hot rolling and optionally cold rolling to produce a cold-rolled sheet having a desired thickness or, alternatively, is subjected to hot extrusion and hot forging to produce a shaped or forged 6066 alloy material having a desired thickness and a desired form. Preferred conditions for each step are mentioned below, however, the conditions are common in the production of a rolled sheet (rolling), a shaped extrusion material (extrusion) and a forged material (forging), unless otherwise specified.

(Melting, and Cast Cooling Rate)

First, in a melting/casting step, an aluminum alloy melt which has been melted so as to have composition falling within a range of the specified 6066-based composition, is cast by properly selecting a melting/casting method such as a direct chill casting method (a DC casting method).

(Homogenization Heat Treatment)

Prior to the above-mentioned various hot processing procedures, the aluminum alloy cast ingot is subjected to a homogenization heat treatment (a soaking treatment) at a relatively high temperature of 540° C. or higher, thereby homogenizing the structure of the cast ingot (i.e., eliminating the segregation in crystal grains in the structure of the ingot) and reducing the sizes of the crystallized materials. As disclosed in Patent Document 5 mentioned above, if the temperature of the soaking treatment is set to a relatively low temperature ranging from 350 to 550° C. (540° C. in examples of the document), the crystallized materials cannot be reduced in size and there is a risk that many coarse crystallized materials may be formed even if the composition of the ingot falls within the composition range specified in the present invention. Therefore, too many crystallized materials that can become an initiation site for fracture are formed, which may cause a high risk of deterioration in resistance to hydrogen embrittlement and further deterioration in toughness and fatigue properties.

On the other hand, if the temperature of the soaking treatment is too high, the dispersed particles may become coarse, and the density of the dispersed particles is likely to be decreased. Therefore, hydrogen trapping sites are also decreased, which may cause a high risk of deterioration in resistance to hydrogen embrittlement. Further, due to coarse of the dispersed particles and a decrease in density of the dispersed particles, recrystallization easily occurs and the crystal grains become coarse, which easily result in deterioration in strength. Furthermore, burning of the ingot may easily occur. Therefore, the upper limit of the temperature of the soaking treatment is 575° C.

After the soaking treatment, it is preferred to forcibly and rapidly cool the billet (ingot) using a fan or the like in order to increase the cooling rate. If the cooling rate is slow (for example, the case where the billet (ingot) is cooled in air), the crystallized materials may have a risk to become coarse during the cooling process. An average cooling rate in the rapid cooling is preferably 80° C./hour or more until the temperature reaches 300° C. or lower (including room temperature).

(Hot Processing)

The hot processing such as hot rolling, hot extrusion and hot forging is performed in a routine manner. In other words, no special condition is needed. The starting temperature of the hot processing is selected from a range of 350 to 575° C., depending on the component composition of the aluminum alloy and a relationship with the size of the ingot. A reduction rate for the hot processing is selected from a range of 85% or more, depending on the component composition of the aluminum alloy and a relationship between the size of the ingot and the thickness desired for the aluminum alloy material (product). If the reduction rate is too small, the crystallized materials cannot be pulverized to small pieces. As a result, coarse crystallized materials remain, and the crystallized materials cannot be reduced in size as defined in the present invention.

For the production of a rolled sheet, the ingot which has undergone the homogenization heat treatment is cooled to a hot rolling temperature or, alternatively, is cooled to room temperature and then is re-heated to the hot rolling temperature. The resultant material is then subjected to hot rolling, thereby producing a hot-rolled sheet having a desired thickness. If necessary, the hot-rolled sheet may be further subjected to cold rolling to produce a cold-rolled sheet having a desired thickness. The resultant rolled sheet is then tempered. If necessary, annealing may be performed between the hot rolling and the cold rolling or between the passes of the cold rolling.

For the production of an extrusion material, the ingot which has undergone the homogenization heat treatment is re-heated and hot-extruded at a temperature ranging from 350 to 575° C. to produce a material having a desired thickness and a desired form. If necessary, the resultant material may be further subjected to cold extrusion (core pulling processing) to produce a material having a desired form and a desired thickness. The extruded sheet is then tempered. If necessary, annealing may be performed between the hot extrusion and the cold extrusion or between the passes of the cold extrusion (core pulling processing).

For the production of a forged material, the ingot which has undergone the homogenization heat treatment is re-heated, and then subjected to hot forging at a temperature ranging from 350 to 575° C. to produce a forged material having a desired thickness. If necessary, the resultant forged material may be further subjected to hot forging, warm forging and cold forging to produce a forged material having a desired thickness. The forged material is then tempered. If necessary, annealing may be performed between the passes of the hot forging, the warm forging and the cold forging.

(Tempering Treatment)

Subsequent to the hot processing, as a tempering treatment for the aluminum alloy material, first, a solution heat treatment and a rapid cooling (quenching) treatment are performed. The solution heat treatment is preferably performed under the condition of retention at 530 to 570° C. for a predetermined time because of a relationship with the component composition of the aluminum alloy material, or for the purpose of causing aging precipitates (which are involved in an improvement in strength) to be precipitated satisfactorily in the grains by a subsequent artificial aging hardening treatment at high temperature. Immediately after the solution heat treatment, a rapid cooling treatment (quenching treatment) is performed at a cooling rate of 10° C./second or more. If the cooling rate of the rapid cooling treatment that is performed subsequent to the solution heat treatment is slow, Si, an MgSi compound or the like may be precipitated at crystal grain boundaries, resulting in deterioration in mechanical properties and formability.

As for a heat treatment furnace to be used for the solution heat treatment and the quenching treatment, any of a batch furnace, a continuous furnace and a molten salt bath furnace may be used. The quenching treatment to be performed subsequent to the solution heat treatment may be performed by any of water immersion, water jet, mist jet, air jet, and cooling in air. Further, a high-temperature aging treatment to be performed subsequent to the solution heat treatment and the quenching treatment may be performed using any of a batch furnace, a continuous furnace, an oil bath, a warm water bath and the like.

Subsequent to the solution heat treatment and the quenching treatment, for the purpose of improving mechanical properties including strength, the high-temperature aging treatment is performed at 150 to 200° C. preferably immediately. This tempering treatment is a tempering treatment designated as a tempering designation number of T6 (a solution heat treatment and a quenching treatment+a peak aging treatment) which is performed under heat treatment conditions as described in, for example, JIS H-0001. If the high-temperature aging treatment is not performed, it is difficult to impart such mechanical properties that the tensile strength is 410 MPa or more, the 0.2% yield strength is 360 MPa or more and the elongation is 10% or more to the T6-tempered aluminum alloy material.

In the production of the extrusion material, the hot extrusion may be performed while re-heating the cast billet in such a manner that the temperature of the material for extrusion on the discharge port side in the hot extrusion falls within a temperature range for solution heat treatment. Subsequently, immediately after the hot extrusion, the extrusion material may be forcibly cooled in an on-line manner to temperature around room temperature by water jet, mist jet, air jet or the like, and the annealing treatment may be then performed. Thereafter, if necessary, room-temperature aging, correction of strain, and then a high-temperature aging treatment may be performed. After performing the core pulling processing as required, the solution heat treatment, the quenching, and optionally the room temperature aging and the correction of strain may be performed under the heat treatment conditions as described in, for example, JIS-H-0001, and subsequently the high-temperature tempering treatment (T6) may be performed.

For the production of a container material such as a liner for a high-pressure gas container or a peripheral member of the high-pressure gas container from the rolled material, the extrusion material or the forged material which has undergone the tempering treatment, necessary processing procedures such as drawing, ironing, spinning, cutting and hole punching are performed while heating if necessary. As mentioned above, prior to the production of a member for a high-pressure gas container, the sheet material, the extrusion material or the forged material may be subjected to the tempering treatment selected from the above-mentioned tempering treatments in advance. Alternatively, the sheet material, the extrusion material or the forged material may be formed into a material for a high-pressure gas container or a peripheral member for the high-pressure gas container without performing the tempering treatment, and may be subsequently subjected to the T6-tempering treatment selected from the above-mentioned T6-tempering treatments depending on the properties required for each member. Alternatively, the tempering treatments may be performed in such a divided manner that the solution heat treatment and the quenching treatment are performed prior to the production of the material for a high-pressure gas container or the peripheral member for the high-pressure gas container and then the peak aging treatment is performed.

The present invention will be described in more detail below by way of examples. However, the invention is not limited to the following examples, of course, and any modification may be added properly within the scope compatible with the purport described hereinbefore and hereinafter to carry out the invention. The modifications are also included within the technical scope of the invention.

EXAMPLES

Examples of the present invention will be described below. It was intended to produce a liner to be used in a high-pressure gas container, and rolled aluminum alloy sheets having the component compositions shown in Table 1 were produced under the conditions shown in Table 2. The rolled aluminum alloy sheets were subjected to a T6 tempering treatment, and then the microstructures, mechanical properties and resistance to hydrogen embrittlement thereof were examined and evaluated, respectively. The results are also shown in Table 2. Each example number indicates the same example in Tables 1 and 2.

For producing each of the sheets, a slab was cast from an aluminum alloy melt having each of the component compositions shown in Table 1. The slab was subjected to a homogenization heat treatment at 560° C. for 4 hours as shown in Table 2, and then once cooled to room temperature. The resultant sheet was scraped to a thickness of 46 mm, heated again, and then subjected to a hot rolling procedure starting at a thickness of 46 mm and at a starting temperature of 460° C., thereby producing a hot-rolled sheet having a thickness of 5 mm as in Table 2. The hot-rolled sheet was subjected to a cold rolling procedure without carrying out any intermediate annealing procedure. In this manner, cold-rolled sheets each having a thickness of 1.0 mm were produced.

The cold-rolled sheets were subjected to a solution heat treatment in a batch furnace at 550° C. for 3 hours as shown in Table 2, and were then immediately quenched by a water quenching procedure (shown as "WQ" in Table 2). After the aging of the resultant sheets at room temperature (15 to 35° C.) for 3 days, the strain in the sheets was corrected with a leveler, the sheets were then subjected to a peak aging treatment at 180° C. for 9 hours. In this manner, tempered materials which were tempered by a T6 tempering treatment (a solution heat treatment, a quenching treatment, and then a peak aging treatment) ("T6" is a tempering designation) were produced. An air furnace was used for a soaking treatment, a heating treatment to a hot rolling temperature and a high-temperature aging treatment. The cooling rate between a time point immediately after the solution heat treatment and a time point of the water quenching shown in Table 2 was about 250° C./second. Incidentally, the cooling rate for forced air cooling using a fan is about 50° C./minute.

(Properties of Sample Materials)

The external dimension of each of the tempered sheet materials thus produced was 1.0 mm in length and 200 mm in width. A sample material (a sheet-like specimen) was cut from each of the sheet materials which had undergone the high-temperature tempering treatment and then undergone the subsequent room-temperature aging treatment for 30 days (a lapse of 30 days after the high-temperature aging treatment), and the sample material was measured and evaluated with respect to a microstructure, a tensile property and resistance to hydrogen embrittlement. The results are shown in Table 2.

Microstructures:

The average density (particles/μm$^2$) of dispersed particles each having an equivalent circle diameter of 800 nm or less and the average density (particles/mm$^2$) of crystallized materials each having an equivalent circle diameter of 0.38 μm or more in each of the sample materials were measured by the methods mentioned above.

Tensile Test:

The tensile test was performed in the following manner. A JIS 5 specimen (GL50 mm) in accordance with JIS Z2201 was collected from each of the sample materials in such a manner that the lengthwise direction of the specimen became perpendicular to the rolling direction, and the specimen was subjected to a tensile test at room temperature and atmosphere, and at a cross head rate of 5 mm/minute. The number of measurements (N) was 5, and each of the mechanical properties was determined as an average value of the measurement values.

Test for Resistance to Hydrogen Embrittlement:

The index of the resistance to hydrogen embrittlement of the sample material was obtained by $[(\delta 1-\delta 2)/\delta 1]$, wherein $\delta 1$ represents an elongation value of the aluminum alloy material that is tensile-deformed in a dried atmosphere of 5% RH or less and $\delta 2$ represents an elongation value of the aluminum alloy material that is tensile-deformed in a highly humid atmosphere of 90% RH or more when the aluminum alloy material is tensile-deformed at a strain rate of $6.7 \times 10^{-7}$ s$^{-1}$ or less under different atmospheric conditions. Specifically, a small tensile test specimen having a parallel part of 5 mm in width and 12 mm in length and a shoulder portion radius of 7.5 mm was collected from each of the sample materials in such a manner that the lengthwise direction of the specimen became perpendicular to the rolling direction of the sheet, and was then subjected to a tensile test at an initial strain rate of $6.7 \times 10^{-7}$ s$^{-1}$ under two different atmospheric conditions (i.e., a dried atmosphere of 5% RH or less and a highly humid atmosphere of 90% RH or more) until the specimen was broken. The rate of reduction in elongation value between the elongation value δ2 measured in the highly humid atmosphere of 90% RH or more and the elongation value δ81 as measured in the dried atmosphere of 5% RH or less was calculated in accordance with the formula mentioned above. It can be determined that the smaller the rate of reduction in elongation value such as 0.1 or less, and more preferably 0.05 or less, the better the resistance to hydrogen embrittlement.

In this regard, the rate of reduction in elongation value of 0.05 is a reference value determined by subjecting a 6061-T6 material, which is used as a hydrogen container member and is well evaluated as having excellent resistance to hydrogen embrittlement, to the resistance to hydrogen embrittlement test under the same conditions. The rate of reduction in elongation value of 10% is a referenced value determined by subjecting a 7050-T7 material, which is not used as a hydrogen container member but is well evaluated as a structural member having excellent corrosion resistance, to the resistance to hydrogen embrittlement test under the same conditions.

As is apparent from Tables 1 and 2, Invention Examples 1 to 3 have both of high strength and high resistance to hydrogen embrittlement. That is, in the invention examples, the requirement for the aluminum alloy composition of the present invention is satisfied and the production conditions including tempering conditions are proper. Therefore, in each of Invention Examples 1 to 3, the relationship between the average density D (particles/μm$^2$) of dispersed particles each having an equivalent circle diameter of 800 nm or less and the average density C (particles/mm$^2$) of crystallized materials each having an equivalent circle diameter of 0.38 μm or more satisfies the formula: D+0.0011×C−9.5≤0 (D≤−0.0011×C+9.5), and the structure of each of Invention Examples 1 to 3 has a predetermined amount of fine dispersed particles dispersed therein and contains a few coarse crystallized materials. Consequently, each of Invention Examples 1 to 3 has a tensile strength of 410 MPa or more, a 0.2% yield strength of 360 MPa or more and an elongation of 10% or more, and also has an excellent resistance to hydrogen embrittlement having an index of resistance to hydrogen embrittlement of 0.1 or less even under a high-pressure hydrogen gas.

In contrast, as is apparent from Tables 1 and 2, Comparative Examples 1 to 3 do not have both satisfactory levels of strength and resistance to hydrogen embrittlement. That is, in each of the comparative examples, the requirements for the aluminum alloy composition specified in the present invention are not satisfied or the production method is not proper.

In Comparative Example 1, the Fe content exceeds the upper limit of the present invention, although the Fe content falls within the range of the standard for AA6066. Therefore, coarse crystallized materials are formed greater amount, the formula: D+0.0011×C−9.5≤0 (D≤−0.0011×C+9.5) is not satisfied, and the resistance to hydrogen embrittlement is poor as compared with those of the invention examples, although the production conditions are proper and a predetermined amount of fine dispersed particles are dispersed therein.

In Comparative Example 2, the Cu content is too small and does not fall within either the range of the present invention or the range of the standard for AA6066. Therefore, strength is poor as compared with those of the invention examples, although the production conditions are proper, the formula: D+0.0011×C−9.5≤0 is satisfied, and the resistance to hydrogen embrittlement is high.

In Comparative Example 3, the Mn content is too small and does not fall within either the range of the present invention or the range of the standard for AA6066. Therefore, strength is poor as compared with those of the invention examples, although the production conditions are proper, the formula: D+0.0011×C−9.5≤0 is satisfied, and the resistance to hydrogen embrittlement is high.

As stated above, therefore, the results of the examples support the critical meaning or effects of the requirements for the components and the composition in the present invention for achieving the resistance to hydrogen embrittlement, the mechanical properties and on the like.

TABLE 1

| Classification | Chemical compositions of aluminum alloys (mass %, remaining portion: Al) | | | | | | | | | Alloy species |
|---|---|---|---|---|---|---|---|---|---|---|
| | si | Fe | Cu | Mn | Mg | Cr | Zn | Zr | Ti | |
| Invention Example 1 | 1.40 | 0.04 | 1.02 | 0.79 | 1.20 | 0.016 | 0.008 | 0.000 | 0.024 | 6066 |
| Invention Example 2 | 1.37 | 0.13 | 1.03 | 0.78 | 1.21 | 0.015 | 0.008 | 0.000 | 0.017 | 6066 |
| Invention Example 3 | 1.40 | 0.21 | 1.02 | 0.70 | 1.17 | 0.018 | 0.008 | 0.000 | 0.017 | 6066 |
| Comparative Example 1 | 1.38 | 0.44 | 0.91 | 0.79 | 1.16 | 0.015 | 0.009 | 0.001 | 0.017 | 6066 |
| Comparative Example 2 | 1.30 | 0.19 | <0.01 | 0.77 | 1.21 | 0.016 | 0.008 | 0.000 | 0.017 | |
| Comparative Example 3 | 1.37 | 0.21 | 1.03 | 0.11 | 1.22 | 0.019 | 0.008 | 0.000 | 0.018 | |

TABLE 2

(Continued from Table 1)

| | Production Processes of rolled sheets | | | | | | |
|---|---|---|---|---|---|---|---|
| | Soaking treatment Temperature | Hot rolling | | Cold rolling | Solution heat treatment Temperature | | High-temperature aging Temperature |
| Classification | (° C.) × time (h) | Temperature (° C.) | Thickness | Thickness | (° C.) × time (h) | Quenching treatment | (° C.) × time (h) |
| Invention Example 1 | 560 × 4 | 460 | 46→5 mm | 5→1 mm | 550 × 3 | WQ | 180 × 9 |

TABLE 2-continued (Continued from Table 1)

| Classification | | | | | | | |
|---|---|---|---|---|---|---|---|
| Invention Example 2 | 560 × 4 | 460 | 46→5 mm | 5→1 mm | 550 × 3 | WQ | 180 × 9 |
| Invention Example 3 | 560 × 4 | 460 | 46→5 mm | 5→1 mm | 550 × 3 | WQ | 180 × 9 |
| Comparative Example 1 | 560 × 4 | 460 | 46→5 mm | 5→1 mm | 550 × 3 | WQ | 180 × 9 |
| Comparative Example 2 | 560 × 4 | 460 | 46→5 mm | 5→1 mm | 550 × 3 | WQ | 180 × 9 |
| Comparative Example 3 | 560 × 4 | 460 | 46→5 mm | 5→1 mm | 550 × 3 | WQ | 180 × 9 |

| | Properties of rolled sheets after T6 tempering | | | | | | |
|---|---|---|---|---|---|---|---|
| | Tensile properties | | | Resistance to hydrogen embrittlement | Microstructures | | |
| Classification | Tensile strength (MPa) | 0.2% Yield strength (MPa) | Elongation (%) | Index of resistance to hydrogen embrittlement | Average density C of crystallized materials (particles/mm$^2$) | Average density D of dispersed particles (particles/µm$^2$) | D + 0.0011 × C − 9.5 ≤ 0 |
| Invention Example 1 | 426 | 375 | 12 | 0.0008 | 2150 | 1.4 | −5.74 |
| Invention Example 2 | 428 | 375 | 13 | 0.0009 | 3200 | 1.4 | −4.58 |
| Invention Example 3 | 429 | 375 | 13 | 0.030 | 3025 | 1.3 | −4.87 |
| Comparative Example 1 | 423 | 379 | 12 | 0.288 | 7780 | 1.6 | 0.66 |
| Comparative Example 2 | 391 | 357 | 11 | −0.037 | 5170 | 1.0 | −2.81 |
| Comparative Example 3 | 400 | 360 | 12 | −0.013 | 6280 | 0.72 | −1.87 |

INDUSTRIAL APPLICABILITY

As described above, the present invention can provide a 6000-series aluminum alloy material for a storage container for high-pressure hydrogen gas, which has excellent strength and excellent resistance to hydrogen embrittlement. The 6000-series aluminum alloy material can be used as a member such as a liner, a mouthpiece or a gas tube in a high-pressure gas container in which a reinforcing fiber is wound around the outer surface of a liner made of an aluminum alloy or a plastic material.

The invention claimed is:

1. An aluminum alloy material comprising, in mass %,
0.8 to 1.4% of Mg;
0.9 to 1.8% of Si;
less than 0.44% but more than 0% of Fe;
0.7 to 1.2% of Cu;
0.7 to 0.9% of Mn;
0 to 0.40% of Cr;
0 to 0.25% of Zn; and
0 to 0.20% of Ti;
with a remaining portion comprising Al and unavoidable impurities,
wherein a relationship between C and D satisfies the formula: D+0.0011×C−9.5≤0 when D represents an average density, in particles/µm$^2$, of dispersed particles each having an equivalent circle diameter of 800 nm or less and C represents an average density, in particles/mm$^2$, of crystallized materials each having an equivalent circle diameter of 0.38 µm or more in a structure of the aluminum alloy material, and
wherein the aluminum alloy material is suitable for a storage container for high pressure hydrogen gas.

2. The aluminum alloy material of claim 1,
wherein after being subjected to a T6 tempering treatment, the aluminum alloy material has mechanical properties of
a tensile strength of 410 MPa or more,
a 0.2% yield strength of 360 MPa or more and
an elongation of 10% or more, and
the aluminum alloy material is suitable for use as a liner material for a storage container for high-pressure hydrogen gas in such a manner that a fiber-reinforced resin or a fiber for reinforcement is wound around the outside of the aluminum alloy material.

3. The aluminum alloy material of claim 1,
wherein the aluminum alloy material has an index of a resistance to hydrogen embrittlement represented by [(δ1-δ2)/δ1] of 0.1 or less, including a negative value, when δ1 represents an elongation value of the aluminum alloy material that is tensile-deformed in a dried atmosphere of 5% RH or less and δ2 represents an elongation value of the aluminum alloy material that is tensile-deformed in a highly humid atmosphere of 90% RH or more in the case where the aluminum alloy material is tensile-deformed at a strain rate of 6.7×10$^{-7}$ s$^{-1}$ or less under different atmospheric conditions.

4. The aluminum alloy material of claim 3, wherein the index of a resistance to hydrogen embrittlement is 0.05 or less.

5. The aluminum alloy material of claim 1, comprising 0.04 to less than 0.44% of Fe.

6. The aluminum alloy material of claim 1, comprising 0.04 to 0.21% of Fe.

7. The aluminum alloy material of claim 1, comprising 1.02 to 1.03% of Cu.

8. The aluminum alloy material of claim 1, comprising 0.70 to 0.79% of Mn.

9. The aluminum alloy material of claim 1, comprising 1.17 to 1.21% of Mg.

10. The aluminum alloy material of claim 2, having a tensile strength of more than 425 MPa.

11. The aluminum alloy material of claim 2, having a 0.2% yield strength of 375 MPa or more.

12. The aluminum alloy material of claim 2, having an elongation of 12% or more.

13. The aluminum alloy material of claim 1, wherein C is 2150 to 3025.

14. The aluminum alloy material of claim 1, wherein D is 1.3 to 1.4.

15. The aluminum alloy material of claim 1, comprising more than 0% of Cr.

16. The aluminum alloy material of claim 1, comprising more than 0% of Zn.

17. The aluminum alloy material of claim 1, comprising more than 0% of Ti.

18. The aluminum alloy material of claim 1, comprising more than 0% of Cr, more than 0% of Zn, and more than 0% of Ti.

19. The aluminum alloy material of claim 1, comprising 0.015 to 0.018% of Cr.

20. The aluminum alloy material of claim 1, comprising 0.017 to 0.024% of Ti.

\* \* \* \* \*